April 25, 1939.  W. F. HEROLD  2,155,826
CASTER
Filed Aug. 26, 1936
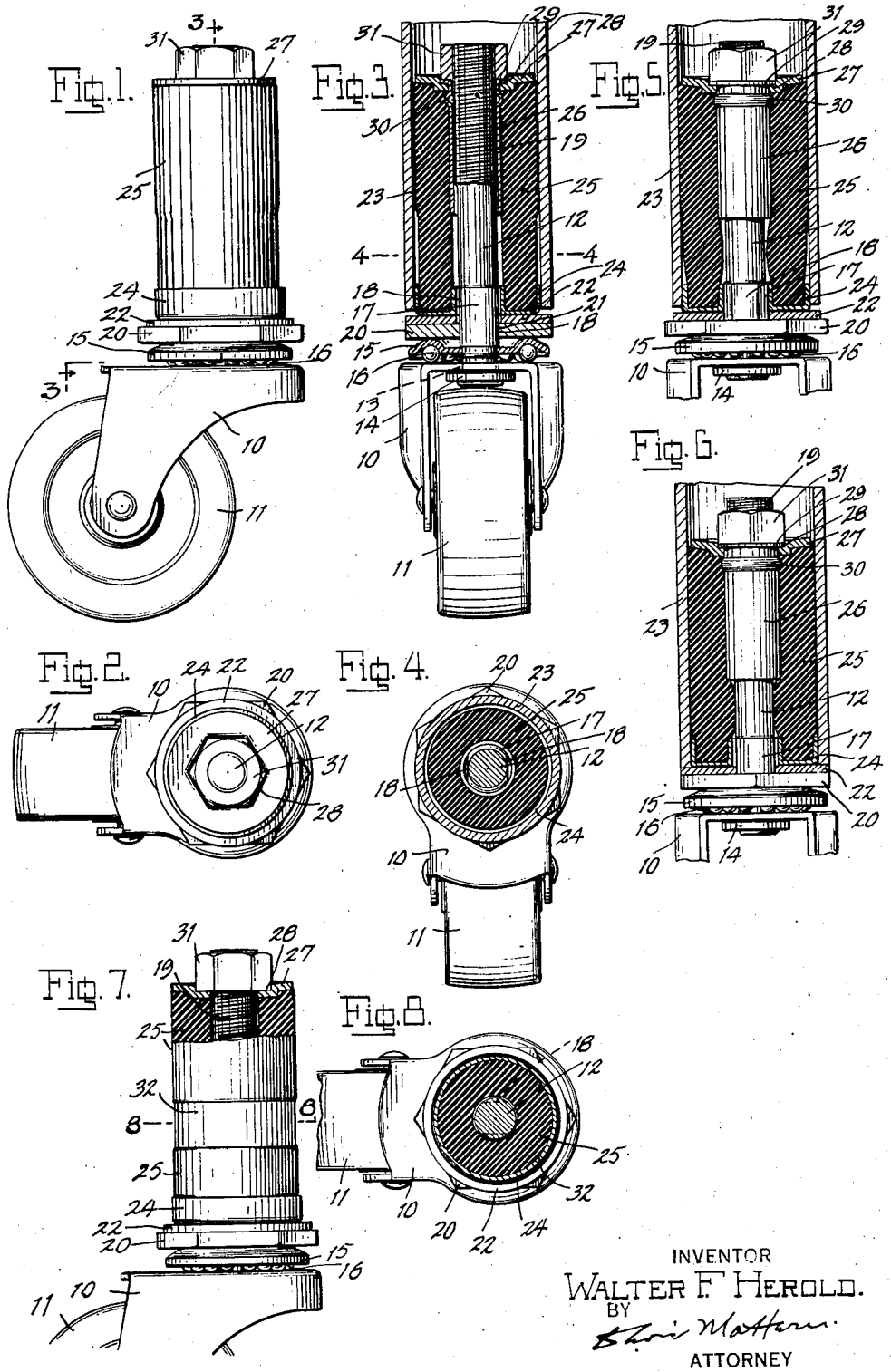
INVENTOR
WALTER F. HEROLD.
BY
ATTORNEY Patented Apr. 25, 1939

2,155,826

UNITED STATES PATENT OFFICE 2,155,826

CASTER

Walter F. Herold, Bridgeport, Conn., assignor to The Bassick Company, Bridgeport, Conn., a corporation of Connecticut Application August 26, 1936, Serial No. 97,904

5 Claims. (Cl. 16—38)

The present invention relates to improvements in casters, particularly for attachment to tubular legs, and has for an object to provide expanding attachment means for insertion in the leg, in which the expanding element consists of a rubber member which both retains the caster in relation to the leg and provides shock absorbing means for preventing transmission of shock to the furniture as the caster is moved about. Another object is to provide such a caster in which the rubber expanding element is in the form of a sleeve and which is arranged to expand in such manner that its top first grips the interior of the leg and then causes the caster to be drawn upwardly in relation to the leg whereby a tight axial relation between the caster and the leg is established.

It is particularly proposed to provide means whereby the rubber sleeve upon being axially compressed and laterally expanded first has gripping engagement with the leg near its upper end, the caster being drawn into the leg during the continued axial compression and lateral expansion of the rubber sleeve at the lower end as the upper end is held.

A further object is to provide a caster having attaching means consisting of an elongated rubber sleeve disposed about a central stem, and further to provide spacing means between the stem and the rubber sleeve, whereby the latter will not grip the surface of the stem and will therefore permit the latter to be easily turned for the purpose of axially compressing and laterally expanding the rubber sleeve.

Another object is to provide a caster of extremely simple construction, and which may be operated with comparative ease to both engage or disengage the same with respect to the leg.

With the above and other objects in view embodiments of the invention are shown in the accompanying drawing and these embodiments will be hereinafter more fully described with reference thereto, and the invention will be finally pointed out in the claims.

In the drawing:

Fig. 1 is a side elevation of a caster according to an exemplary embodiment of the invention.

Fig. 2 is a top plan view thereof.

Fig. 3 is a vertical sectional view taken along the line 3—3 of Fig. 1, and showing the caster inserted in the tubular leg.

Fig. 4 is a horizontal sectional view taken along the line 4—4 of Fig. 3.

Fig. 5 is a vertical sectional view, with certain of the parts shown in elevation, and showing the rubber sleeve partially axially compressed and laterally expanded.

Fig. 6 is a view similar to Fig. 5 and showing the rubber sleeve completely expanded with the caster in its secured relation to the tubular leg.

Fig. 7 is a side elevation, partially in section, of a modified form of the invention.

Fig. 8 is a horizontal sectional view taken along the line 8—8 of Fig. 7.

Similar reference characters indicate corresponding parts throughout the several figures of the drawing.

Referring to the drawing, the caster, according to the exemplary illustrated embodiment of the invention shown in Figs. 1 to 6, comprises a caster horn 10 carrying a caster wheel 11, the horn being rotatably mounted upon a vertically disposed stem 12 extending through a central aperture 13 in the horn top and retained by means of a riveted washer 14, an annularly grooved circular bearing plate 15 being secured upon the lower end of the stem, between which plate and the horn top there are provided ball bearings 16.

The stem is provided near its lower end above the bearing plate 15 with an enlarged diameter portion 17 having oppositely disposed flats 18—18 thereon and is provided at its upper end with an enlarged diameter threaded portion 19, the stem between the portions 17 and 19 being reduced in diameter to provide a space surrounding the stem for a purpose to be presently more fully pointed out. Upon the portion 17 there is mounted a hexagonal nut 20 having a non-circular aperture 21 corresponding in shape to the cross-section of the portion 17, so that the nut is rotatably fixed with relation to the stem. Above the nut 20 and also upon the portion 17 of the stem there is provided a washer 22 rotatable about the stem and adapted to extend beneath the lower edge of the tubular leg 23 to engage it in the secured relation of the caster.

Upon the upper side of the washer 22 there is also rotatably engaged about the portion 17 of the stem a channel shaped annular base 24, the inner flange of which engages the portion 17, the outer flange of which adapts the annular base to be fitted over the lower end of the tubular cylindrical rubber expansion sleeve 25. The bore of this sleeve 25 is of uniform diameters from end to end and its surface is spaced from the reduced diameter intermediate portion of the stem in the non-expanded state of the sleeve.

Upon the upper threaded portion 19 of the stem there is slidably engaged an elongated tube 26 which snugly engages the upper portion of the bore of the sleeve 25, being slightly larger than the bore of the sleeve so that the outer surface of the sleeve is slightly expanded at its upper portion, as shown in Figs. 1 and 2. To the upper end of this tube 26 there is secured a slightly dished cap plate 27 provided with a hexagonal pocket 28 pressed therein within which a bent over flange 29 at the upper end of the tube is engaged, the tube being provided below the cap plate with an annular outwardly pressed rib 30 whereby the tube and cap plate are secured rigidly together. The upper end of the rubber sleeve 25 is engaged by the plate 27. Upon the upper projecting threaded end 19 of the stem there is engaged a hexagonal nut 31 seated in the hexagonal recess 29 whereby the nut is held against rotation with respect to the cap plate 27. The lower end of the tube 26 terminates in spaced relation to the base ring 24, so that while the tube 26 maintains the upper portion of the rubber sleeve 25 out of contact with the stem an annular space is provided about the reduced diameter portion of the stem into which the rubber sleeve may expand inwardly as the caster is being secured to the leg. Thus the upper portion of the rubber sleeve 25 is restricted to outward expansion, while the lower portion may expand both inwardly and outwardly.

The operation is as follows:

The caster attaching means is secured into the tubular leg 23 as shown in Fig. 3, and as the cooperation of the parts during the axial compression and lateral expansion of the rubber sleeve, as presently to be more fully pointed out, draws the caster upwardly into relation with the leg. The latter need not be fully engaged but may have its lower end spaced from the washer 22 as shown in Fig. 3. The slight expansion of the upper portion of the rubber sleeve 25 is such that it may be readily forced into the leg with slight frictional contact with the interior of the leg.

As shown in Fig. 5 the rotation of the nut 20 and the stem 17 and the resulting axial compression of the rubber sleeve causes the upper portion of the sleeve surrounding the tube 26 to expand outwardly to a greater degree than the lower portion which expands both outwardly and inwardly. The outward camming action of the slightly dished cap plate 27 upon the upper end of the sleeve, as well as the compressing action of the outer rim of the base member 24 upon the lower end of the sleeve contribute to this effect. Thus the upper portion of the sleeve is caused first to grip the interior of the leg. The continued rotation of the nut and stem and the further axial compression of the rubber sleeve causes the lower portion of the rubber sleeve to expand further so that it also grips the interior of the leg as well as a short section of the stem, as shown in Fig. 6. As the upper portion of the rubber sleeve 25 and the tube 26 and cap plate 27 are fixed within the tubular leg, and as the continued compression of the rubber sleeve is brought about by a decrease in the distance between the cap plate 27 and the base ring 24 the stem and the lower portion of the caster carried thereby are drawn upwardly into tight axial relation with the lower end of the tubular leg, the engagement being in the nature of a spring pressure due to the tension set up in the rubber sleeve.

In Figs. 7 and 8 I have shown a modification in which the tube 26 as employed in the first embodiment is dispensed with. A non-expanding thin metal band 32 is placed about the rubber sleeve 25 at a point nearer to the base ring 24 than to the cap plate 27, so that there is a greater body of laterally unrestricted rubber above the band than below it. As a result of this arrangement the upper portion of the rubber sleeve expands to a greater extent than the lower portion and grips before the lower portion, and thus the caster is drawn axially into the tubular leg as the sleeve is compressed axially and expanded laterally.

I have illustrated and described preferred and satisfactory embodiments of the invention, but it will be understood that changes may be made therein within the spirit and scope thereof as defined in the appended claims.

Having thus described my invention what I claim and desire to secure by Letters Patent is:

1. In a furniture support for insertion in a tubular leg, a floor engaging element, a vertical stem connected thereto, an expansion sleeve surrounding said stem, means on said stem for axially compressing said sleeve whereby said sleeve is laterally expanded, and means cooperating with said sleeve to cause differential gripping action of the upper and lower portions of said sleeve comprising a tube disposed within the upper end of said sleeve whereby the upper end is restricted to outward expansion and the lower end is permitted to expand both outwardly and inwardly.

2. In a furniture support for insertion in a tubular leg, a floor engaging element, a vertical stem connected thereto and threaded at its upper end, a nut non-rotatably engaged with the lower portion of said stem, a nut rotatably engaged with the threaded end of said stem, an expansion sleeve surrounding said stem between said nuts and adapted to be axially compressed and laterally expanded upon relative rotation between said stem and said rotatable nut to move said nuts toward each other, and means cooperating with said sleeve to cause differential gripping action of the upper and lower portion of said sleeve comprising a tube disposed within the upper end of said sleeve whereby the upper end is restricted to outward expansion and the lower end is permitted to expand both outwardly and inwardly.

3. In a furniture support for insertion in a tubular leg, a floor engaging element, a vertical stem connected thereto, an expansion sleeve surrounding said stem, means on said stem for axially compressing said sleeve whereby said sleeve is laterally expanded, and means cooperating with said sleeve to cause substantially independent expansion of the upper and lower portions of said sleeve comprising a rigid band engaged about the intermediate portion of said sleeve.

4. In a furniture support for insertion in a tubular leg, a floor engaging element, a vertical stem connected thereto, an expansion sleeve surrounding said stem, means on said stem for axially compressing said sleeve whereby said sleeve is laterally expanded, and means cooperating with said sleeve to cause differential gripping action of the upper and lower portions of said sleeve comprising a rigid band engaged about the intermediate portion of said sleeve at a greater distance from one end than the other.

5. In a furniture support for insertion in a tubular leg, a floor engaging element, a vertical stem connected thereto, an expansion sleeve surrounding said stem, means on said stem for axially compressing said sleeve whereby said sleeve is laterally expanded, a rigid tubular member disposed in lateral bracing relation on a portion of said sleeve to confine lateral expansion in one direction, said tubular member being positioned asymmetrically longitudinally of said sleeve to cause differential expansion of the ends of the sleeve to cause differential gripping action of the upper and lower portions of said sleeve.

WALTER F. HEROLD.